United States Patent
Kasaiezadeh Mahabadi et al.

(10) Patent No.: US 12,179,781 B2
(45) Date of Patent: Dec. 31, 2024

(54) DRIVER COMMAND INTERPRETER SYSTEM DETERMINING ACHIEVABLE TARGET VEHICLE STATE DURING STEADY-STATE AND TRANSIENT DRIVING CONDITIONS

(71) Applicant: GM Global Technology Operations LLC, Detroit, MI (US)

(72) Inventors: SeyedAlireza Kasaiezadeh Mahabadi, Novi, MI (US); Hualin Tan, Novi, MI (US); Ruixing Long, Novi, MI (US); Bharath Pattipati, South Lyon, MI (US); Bo Yu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 18/060,755

(22) Filed: Dec. 1, 2022

(65) Prior Publication Data
US 2024/0182053 A1 Jun. 6, 2024

(51) Int. Cl.
*B60W 50/10* (2012.01)
*B60W 50/00* (2006.01)

(52) U.S. Cl.
CPC ..... *B60W 50/10* (2013.01); *B60W 2050/0022* (2013.01); *B60W 2050/0033* (2013.01); *B60W 2520/12* (2013.01); *B60W 2520/14* (2013.01); *B60W 2530/10* (2013.01); *B60W 2530/20* (2013.01); *B60W 2530/201* (2020.02); *B60W 2552/05* (2020.02); *B60W 2555/20* (2020.02)

(58) Field of Classification Search
CPC . B60W 2050/0022; B60W 2050/0031; B60W 2050/0033; B60W 2520/12; B60W 2520/14; B60W 2530/10; B60W 2530/20; B60W 2530/201; B60W 2552/05; B60W 2555/20; B60W 50/10
See application file for complete search history.

(56) References Cited

U.S. PATENT DOCUMENTS

| | | | |
|---|---|---|---|
| 5,488,555 A * | 1/1996 | Asgari | B62D 7/159 180/408 |
| 6,546,324 B1 * | 4/2003 | Chen | B62D 6/00 180/234 |
| 6,658,342 B1 * | 12/2003 | Hac | B60T 8/1755 303/140 |
| 6,856,886 B1 * | 2/2005 | Chen | B60W 10/184 477/107 |

(Continued)

*Primary Examiner* — Carl C Staubach
(74) *Attorney, Agent, or Firm* — Vivacqua Crane, PLLC

(57) ABSTRACT

A driver command interpreter system for a vehicle includes one or more controllers that execute instructions to receive a plurality of dynamic variables, vehicle configuration information, and driving environment conditions, and determine a target vehicle state during transient driving conditions based on the plurality of dynamic variables from the one or more sensors, the vehicle configuration information, and the driving environment conditions. The one or more controllers build a transient vehicle dynamic model based on the target vehicle state during transient driving conditions, the plurality of dynamic variables, the vehicle configuration information, and the driving environment conditions, and solve for desired zeros corresponding to the target vehicle state during transient conditions.

20 Claims, 3 Drawing Sheets

(56) References Cited

U.S. PATENT DOCUMENTS

| | | | |
|---|---|---|---|
| 6,865,461 B2* | 3/2005 | Neef | B62D 7/159 |
| | | | 701/41 |
| 10,407,034 B2* | 9/2019 | Mahabadi | B60T 8/1755 |
| 2008/0208406 A1* | 8/2008 | Chen | B62D 7/159 |
| | | | 701/41 |
| 2018/0347486 A1* | 12/2018 | Mahabadi | F02P 5/1504 |
| 2019/0256094 A1* | 8/2019 | Kasaiezadeh Mahabadi | |
| | | | B60W 30/182 |
| 2020/0039523 A1* | 2/2020 | Ghasemalizadeh | B62D 15/025 |
| 2020/0339104 A1* | 10/2020 | Nahidi | B60W 50/10 |

* cited by examiner

DRIVER COMMAND INTERPRETER SYSTEM DETERMINING ACHIEVABLE TARGET VEHICLE STATE DURING STEADY-STATE AND TRANSIENT DRIVING CONDITIONS

INTRODUCTION

The present disclosure relates to a driver command interpreter system for a vehicle. More particularly, the present disclosure is directed towards a driver command interpreter system that determines an achievable target vehicle state during steady-state as well as transient driving conditions.

A driver command interpreter (DCI) generates a target vehicle state for a vehicle based on a driver's commands. The driver's commands include inputs such as a steering wheel angle, an acceleration pedal position input, and a brake pedal input. The target vehicle state indicates a target longitudinal force, a target lateral force, and target yaw moment of the vehicle. There are several challenges a driver command interpreter may face when calculating the target vehicle state, especially when vehicle agility is considered.

Thus, while current driver command interpreter systems achieve their intended purpose, there is a need in the art for an improved approach for determining a target vehicle state that considers the transient response of a vehicle.

SUMMARY

According to several aspects, a driver command interpreter system for a vehicle is disclosed and includes one or more controllers executing instructions to receive a plurality of dynamic variables that each represent an operating parameter indicative of a dynamic state of the vehicle, vehicle configuration information, and driving environment conditions. The one or more controllers determine a target vehicle state during transient driving conditions based on the plurality of dynamic variables, the vehicle configuration information, and the driving environment conditions. The one or more controllers build a transient vehicle dynamic model based on the target vehicle state during transient driving conditions, the plurality of dynamic variables, the vehicle configuration information, and the driving environment conditions. The one or more controllers solve for desired zeros corresponding to the target vehicle state during transient conditions based on the transient vehicle dynamic model, where the desired zeros are shaped to result in the target vehicle state during the transient driving conditions being achieved. Finally, the one or more controllers stores the desired zeros in memory, where the one or more controllers employ the desired zeros in real-time to determine real-time constraints upon the vehicle during operation.

In an aspect, the target vehicle state during transient conditions include a target transient yaw rate and a target transient lateral velocity.

In another aspect, the one or more controllers execute instructions to solve for the desired zero corresponding to a yaw rate transfer function that results in the target transient yaw rate being achieved.

In still another aspect, the yaw rate transfer function is expressed as:

$$G_{rd}(s) = \frac{\left(\frac{s}{z_{rd}} + 1\right)\omega_{nd}^2}{s^2 + 2\xi_d\omega_{nd}s + \omega_{nd}^2}\Omega_{gain}$$

where s is a Laplace operator, $G_{rd}(s)$ is the yaw rate transfer function, $z_{rd}$ is the desired zero for the yaw rate transfer function $G_{rd}(s)$, $\omega_{nd}$ is a desired natural frequency, $\xi_d$ is a desired damping ratio, and $\Omega_{gain}$ is the gain of the yaw rate.

In an aspect, the one or more controllers execute instructions to solve for the desired zero corresponding to a lateral velocity transfer function that results in the target transient lateral velocity being achieved.

In another aspect, the target transient lateral velocity is expressed as:

$$G_{v_yd}(s) = \frac{\left(\frac{s}{z_{v_yd}} + 1\right)\omega_{nd}^2}{s^2 + 2\xi_d\omega_{nd}s + \omega_{nd}^2}V_{y\_gain}$$

where s is a Laplace operator, $G_{v_yd}(s)$ is the $G_{v_yd}(s)$, $\omega_{nd}$ is a desired natural frequency, $\xi_d$ is a desired damping ratio, $z_{v_yd}$ is the desired zero for the lateral velocity transfer function $G_{v_yd}(s)$, and $V_{y\_gain}$ is the gain of the lateral velocity.

In yet another aspect, the target transient yaw rate is calculated based on one or more of the following: a size of the vehicle, a mass of the vehicle, a class of the vehicle, a type of the vehicle, the vehicle configuration information, and an expected response of the vehicle.

In an aspect, the target transient lateral velocity is calculated based on one or more of the following: a class of the vehicle, a type of the vehicle, a suspension type of the vehicle, a specific actuator set of the vehicle that is currently being used to execute a driving maneuver, and a perceived yaw center of the vehicle.

In another aspect, the transient vehicle dynamic model is based on a two-degree-of-freedom bicycle model.

In still another aspect, the real-time constraints include one or more of the following: a tire tractive limit, lateral adhesion limits, and actuator bandwidth limits.

In an aspect, the vehicle configuration information indicates one or more of the following: a size of the vehicle, a mass of the vehicle, a class of the vehicle, a type of the vehicle, a number of wheels of the vehicle, a number of driven wheels of the vehicle, and number of steered wheels of the vehicle.

In another aspect, the driving environment conditions include one or more of the following: type of road, road surface, and weather conditions.

In yet another aspect, the one or more controllers execute instructions to determine the target vehicle state during steady-state conditions based on the plurality of dynamic variables, the vehicle configuration information, and the driving environment conditions.

A vehicle including a driver command interpreter system is disclosed and includes a plurality of sensors that collects a plurality of dynamic variables that each represent an operating parameter indicative of a dynamic state of the vehicle, one or more controllers in electronic communication with the plurality of sensors. The one or more controllers executes instructions to receive the plurality of dynamic variables from the plurality of sensors, vehicle configuration information, and driving environment conditions. The one or more controllers determine a target vehicle state during transient driving conditions based on the plurality of dynamic variables from the one or more sensors, the vehicle configuration information, and the driving environment conditions. The one or more controllers build a transient vehicle dynamic model based on the target vehicle state during transient driving conditions, the plurality of dynamic variables, the vehicle configuration information, and the driving environment conditions. The one or more controllers solve for desired zeros corresponding to the target vehicle state during transient conditions based on the transient vehicle dynamic model, where the desired zeros are shaped to result in the target vehicle state during the transient driving conditions being achieved. Finally, the one or more controllers store the desired zeros in memory, wherein the one or more controllers employ the desired zeros in real-time to determine real-time constraints upon the vehicle during operation.

In an aspect, the target vehicle state during transient conditions include a target transient yaw rate and a target transient lateral velocity.

In another aspect, the one or more controllers execute instructions to solve for the desired zero corresponding to a yaw rate transfer function that results in the target transient yaw rate being achieved.

In yet another aspect, the yaw rate transfer function is expressed as:

$$G_{rd}(s) = \frac{\left(\frac{s}{z_{rd}} + 1\right)\omega_{nd}^2}{s^2 + 2\xi_d \omega_{nd} s + \omega_{nd}^2} \Omega_{gain}$$

where s is a Laplace operator, $G_{rd}(s)$ is the yaw rate transfer function, $z_{rd}$ is the desired zero for the yaw rate transfer function $G_{rd}(s)$, $\omega_{nd}$ is a desired natural frequency, $\xi_d$ is a desired damping ratio, and $\Omega_{gain}$ is the gain of the yaw rate.

In an aspect, the one or more controllers execute instructions to solve for the desired zero corresponding to a lateral velocity transfer function that results in the target transient lateral velocity being achieved.

In another aspect, the target transient lateral velocity is expressed as:

$$G_{v_y d}(s) = \frac{\left(\frac{s}{z_{v_{yd}}} + 1\right)\omega_{nd}^2}{s^2 + 2\xi_d \omega_{nd} s + \omega_{nd}^2} V_{y\_gain}$$

where s is a Laplace operator, $G_{v_y d}(s)$ is the $G_{v_y d}(s)$, $\omega_{nd}$ is a desired natural frequency, $\xi_d$ is a desired damping ratio, $z_{v_{yd}}$ is the desired zero for the lateral velocity transfer function $G_{v_y d}(s)$, and $V_{y,gain}$ is the gain of the lateral velocity.

In an aspect, a method for determining a target vehicle state during transient driving conditions by a driver command interpreter system is disclosed. The method includes receiving, by one or more controllers, a plurality of dynamic variables from one or more sensors, vehicle configuration information, and driving environment conditions, where the plurality of dynamic variables each represent an operating parameter indicative of a dynamic state of the vehicle. The method includes determining a target vehicle state during transient driving conditions based on the plurality of dynamic variables from the plurality of sensors, the vehicle configuration information, and the driving environment conditions. The method includes building a transient vehicle dynamic model based on the target vehicle state during transient driving conditions, the plurality of dynamic variables, the vehicle configuration information, and the driving environment conditions. The method also includes solving for desired zeros corresponding to the target vehicle state during the transient conditions based on the transient vehicle dynamic model, where the desired zeros are shaped to result in the target vehicle state during the transient driving conditions being achieved. Finally, the method includes storing the desired zeros in memory, wherein the one or more controllers employ the desired zeros in real-time to determine real-time constraints upon a vehicle during operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
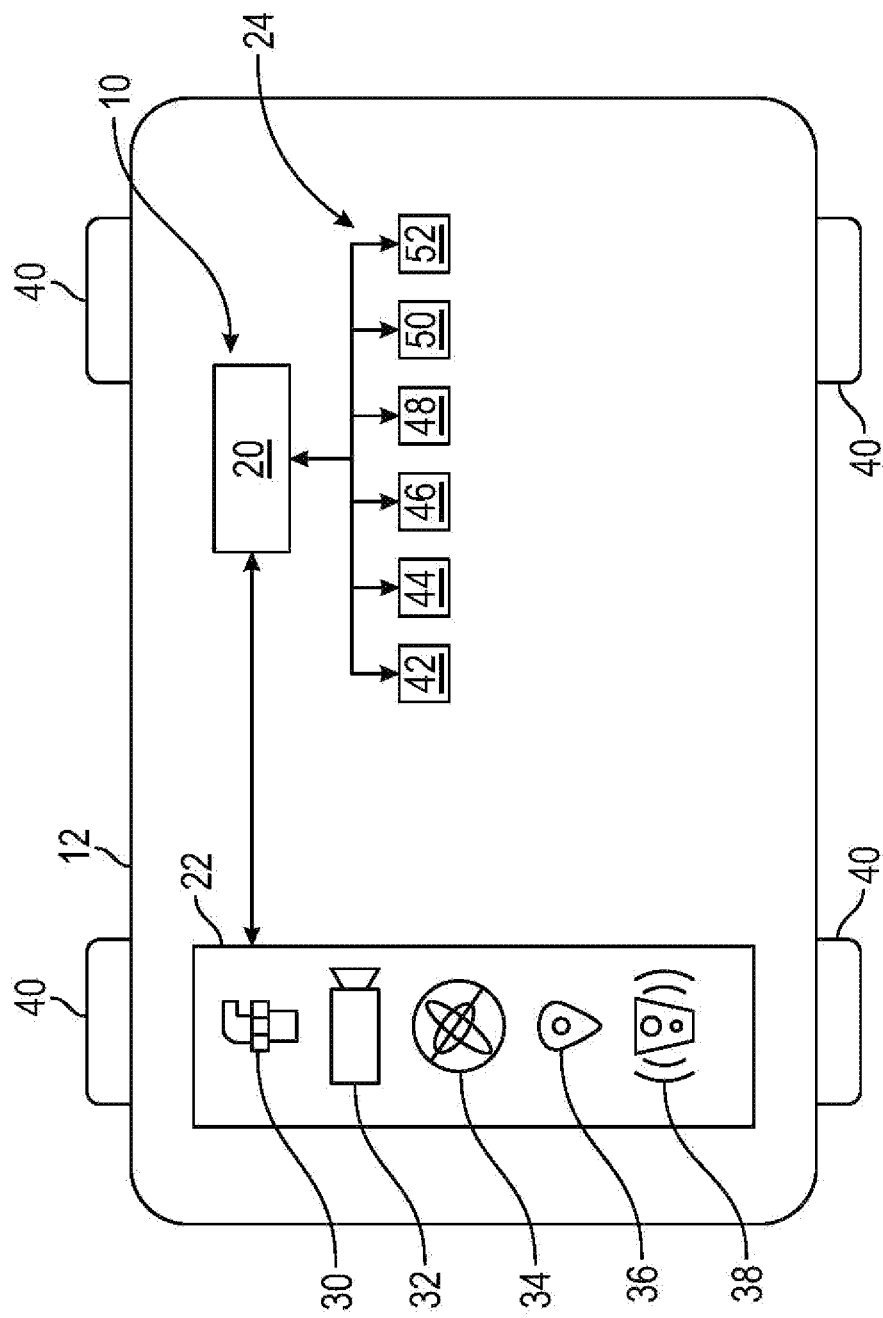
FIG. 1 is a schematic diagram of a vehicle including the disclosed driver command interpreter system, where the driver command interpreter system includes one or more controllers, according to an exemplary embodiment.

Referring to FIG. 1, an exemplary driver command interpreter system 10 for a vehicle 12 is illustrated. As explained below, the driver command interpreter system 10 determines an achievable target vehicle state based on a target transient response of the vehicle 12. It is to be appreciated that the vehicle 12 may be any type of vehicle such as, but not limited to, a sedan, truck, sport utility vehicle, van, or motor home. The vehicle 12 may be operated manually by a user or, alternatively, the vehicle 12 is a semi-autonomous vehicle including an advanced driver assistance system (ADAS) for assisting a user with steering, braking, and accelerating.

The driver command interpreter system 10 includes one or more controllers 20 in electronic communication with a plurality of sensors 22 configured to monitor data indicative of a dynamic state of the vehicle 12. In the non-limiting embodiment as shown in FIG. 1, the plurality of sensors 22 include one or more wheel speed sensors 30 for measuring an angular wheel speed of one or more wheels 40 of the vehicle 12, one or more cameras 32, an inertial measurement unit (IMU) 34, a global positioning system (GPS) 36, and LiDAR 38, however, is to be appreciated that additional sensors may be used as well. The one or more controllers 20 are also in electronic communication with a plurality of vehicle control systems 24. In one non-limiting embodiment, the vehicle control systems 24 include an electronic stability control system 42, an active suspension control system 44, an active roll control system 46, a torque vectoring control system 48, an active rear steering system 50, and an active downforce control system 52, however, it is to be appreciated that other vehicle control systems may be included as well.

As explained below, the disclosed driver command interpreter system 10 determines an achievable target vehicle state during transient driving conditions based on specific agility and stability requirements of the vehicle 12, where the target vehicle state during transient conditions include a target transient yaw rate $r_{ttarget}$ and a target transient lateral velocity $V_{yttarget}$. Specifically, the driver command interpreter system 10 determines the target transient yaw rate $r_{ttarget}$ and the target transient lateral velocity $V_{yttarget}$ by shaping desired zeros $z_{rd}$, $z_{v_{yd}}$ corresponding to a yaw rate transfer function $G_{rd}(s)$ and a lateral velocity transfer function $G_{v_{yd}}(s)$, respectively, according to specific agility and stability requirements of the vehicle 12. It is to be appreciated that the agility and stability requirements of a vehicle vary considerably based on the vehicle type and weight. For example, a performance vehicle, which is constructed specifically for speed, may have substantially different agility and stability requirements when compared to an electric vehicle, which is considerably heavier in weight.

Figure 2:
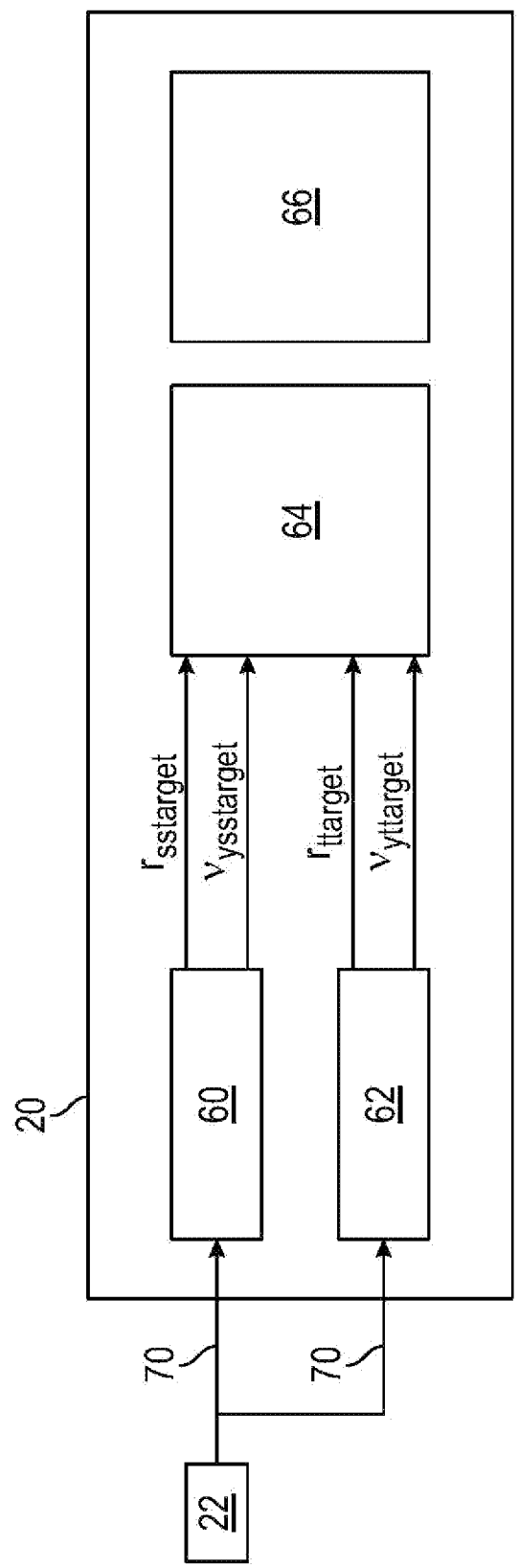
FIG. 2 is a block diagram of the one or more controllers shown in FIG. 1.

FIG. 2 is a block diagram of the one or more controllers 20 shown in FIG. 1, where the one or more controllers 20 include a steady-state target module 60, a transient target module 62, a model building module 64, and a real-time calibration module 66. The steady-state target module 60 receives a plurality of dynamic variables 70 from the plurality of sensors 22, vehicle configuration information, and driving environment conditions as input. The dynamic variables 70 each represent an operating parameter indicative of a dynamic state of the vehicle 12 (FIG. 1). The vehicle configuration information indicates information such as, but not limited to, a size of the vehicle 12, a mass of the vehicle 12, a class of the vehicle 12, a type of the vehicle 12, a number of wheels of the vehicle 12, a number of driven wheels of the vehicle 12, and number of steered wheels of the vehicle 12. Some examples of driving environment conditions include, but are not limited to, type of road, road surface, and weather conditions. The vehicle class refers to the vehicle emissions control and the fuel economy of the vehicle 12, and the type of vehicle refers to whether the vehicle 12 is a sedan, coupe, sports car, truck, and the like. It is to be appreciated that the dynamic variables 70 are determined based on experimental data or, alternatively, simulated data.

The steady-state target module 60 determines a target vehicle state during steady-state conditions based on any existing technique, where the target vehicle state during steady-state conditions is determined based on the dynamic variables 70, the vehicle configuration information, and the driving environment conditions. The target vehicle state during steady-state conditions include a target steady-state yaw rate $r_{sstarget}$ and a steady-state target vehicle velocity $V_{ysstarget}$ for the vehicle 12.

The transient target module 62 receives the plurality of dynamic variables 70, the vehicle configuration information, and the driving environment conditions as input and determines a target vehicle state during transient driving conditions based on the input. Specifically, the target vehicle state during transient conditions include the target transient yaw rate $r_{ttarget}$ and the target transient lateral velocity $V_{yttarget}$. The target transient yaw rate $r_{ttarget}$ is calculated based on one or more of the following: the size of the vehicle 12, the mass of the vehicle 12, the class of the vehicle 12, the type of the vehicle 12, the vehicle configuration information, and an expected response of the vehicle 12. The expected response of the vehicle 12 refers to a behavior of the vehicle 12 as expected by a user based on the current driving conditions. The target transient yaw rate $r_{ttarget}$ is tuned to create the smallest rise time possible based on the dynamic variables 70, where the rise time represents a duration of time between a predefined low value and a predefined high value of a transient yaw rate signal, and is a non-zero value.

The target transient lateral velocity $V_{yttarget}$ is calculated based on one or more of the following: the class of the vehicle 12, the type of vehicle 12, a suspension type of the vehicle 12, a specific actuator set of the vehicle 12 that is currently being used to execute a driving maneuver, and a perceived yaw center of the vehicle 12. The perceived yaw center refers to a conceptual point along a body of the vehicle 12 and is expressed in a body-centered coordinate system of the vehicle 12. Specifically, the perceived yaw center represents a conceptual point that a user of the vehicle 12 interprets as an instant center of rotation for the body of the vehicle 12. Also, the perceived yaw center may be defined as a point where relative lateral velocity and acceleration vanishes. It is to be appreciated that the point of the perceived yaw center changes instantaneously during handling of the vehicle 12 and is affected by the yaw and lateral motion of the vehicle 12. The target transient lateral velocity $V_{yttarget}$ IS tuned to create the fastest possible lateral transient motion of the vehicle 12 in a direction that is anticipated by the user of the vehicle 12. The transient target module 62 also tunes the target transient yaw rate $r_{ttarget}$ and the target transient lateral velocity $V_{yttarget}$ to create the smallest possible time delay between target transient yaw rate $r_{ttarget}$ and the target transient lateral velocity $V_{yttarget}$, while still achieving the expected response of the vehicle 12.

The model building module 64 of the one or more controllers 20 receives the target steady-state yaw rate $r_{sstarget}$, the steady-state target vehicle velocity $V_{ysstarget}$, the target transient yaw rate $r_{ttarget}$, the target transient lateral velocity $V_{yttarget}$, the plurality of dynamic variables 70, the vehicle configuration information, and the driving environment conditions as input. The model building module 64 builds a steady-state vehicle dynamics model based on the target steady-state yaw rate $r_{sstarget}$ and the steady-state target vehicle velocity $V_{ysstarget}$. The model building module 64 also builds a transient vehicle dynamics model based on the target transient yaw rate $r_{ttarget}$ and the target transient lateral velocity $V_{yttarget}$. In one non-limiting embodiment, the steady-state vehicle dynamics model and the transient vehicle dynamic model are based on a two-degree-of-freedom bicycle model, however, it is to be appreciated that other types of vehicle models may be used as well. The transient vehicle dynamic model includes a second order yaw rate transfer function $G_{rd}(s)$, which is expressed in Equation 1, and a second order lateral velocity transfer function $G_{v_{yd}}(s)$, which is expressed in Equation 2 below as:

$$G_{rd}(s) = \frac{\left(\frac{s}{z_{rd}} + 1\right)\omega_{nd}^2}{s^2 + 2\xi_d\omega_{nd}s + \omega_{nd}^2}\Omega_{gain} \qquad \text{Equation 1}$$

$$G_{v_{yd}}(s) = \frac{\left(\frac{s}{z_{v_{yd}}} + 1\right)\omega_{nd}^2}{s^2 + 2\xi_d\omega_{nd}s + \omega_{nd}^2}V_{y\_gain} \qquad \text{Equation 2}$$

where s is the Laplace operator, $z_{rd}$ is a desired zero for the yaw rate transfer function $G_{rd}(s)$, $\omega_{nd}$ is a desired natural frequency, $\xi_d$ is a desired damping ratio, $\Omega_{gain}$ is the gain of the yaw rate, $z_{v_{yd}}$ is a desired zero for the lateral velocity transfer function $G_{v_{yd}}(s)$, and $V_{y,gain}$ is the gain of the lateral velocity.

The model building module 64 then solves for the desired zero $z_{rd}$ for the yaw rate transfer function $G_{rd}(s)$ that results in the target transient yaw rate $r_{ttarget}$ being achieved. The desired zero $z_{rd}$ is the root of the numerator of the yaw rate transfer function $G_{rd}(s)$ expressed in Equation 1 that results in the target transient yaw rate $r_{ttarget}$ being achieved. A change in the value of the target transient yaw rate $r_{ttarget}$ results in a change in the value of the desired zero $z_{rd}$. Similarly, the model building module 64 solves for the desired zero $z_{v_{yd}}$ for the lateral velocity transfer function $G_{v_{yd}}(s)$ that results in the target transient lateral velocity $V_{yttarget}$ being achieved. The desired zero $z_{v_{yd}}$ is the root of the numerator of the lateral velocity transfer function $G_{v_{yd}}(s)$ expressed in Equation 2 that results in the target transient lateral velocity $V_{yttarget}$ being achieved. A change in the value of the target transient lateral velocity $V_{yttarget}$ results in a change in the value of the desired zero $z_{v_{yd}}$.' It is to be appreciated that the desired zero $z_{rd}$ for the yaw rate transfer function $G_{rd}(s)$ is shaped according to specific performance requirements that are determined based on the class and the type of the vehicle 12. Similarly, the desired zero $z_{v_{yd}}$ for the lateral velocity transfer function $G_{v_{yd}}(s)$ is shaped according to specific performance requirements that are determined based on the class and the type of the vehicle 12. It is to be appreciated that the desired zero $z_{v_{yd}}$ for the lateral velocity transfer function $G_{v_{yd}}(s)$ is shaped according to specific performance requirements that are determined based on the class and the type of the vehicle 12. The desired zeros $z_{rd}$, $z_{v_{yd}}$ corresponding to the yaw rate transfer function $G_{rd}(s)$ and the lateral velocity transfer function $G_{v_{yd}}(s)$ are tuned to adjust for agility and stability of the vehicle 12, which may vary based on the vehicle type and weight. For example, a performance vehicle, which is constructed specifically for speed, may be tuned to exhibit enhanced transient handling control and speed.

In addition to the desired zeros $z_{rd}$, $z_{v_{yd}}$ corresponding to the yaw rate transfer function $G_{rd}(s)$ and the lateral velocity transfer function $G_{v_{yd}}(s)$, the transient module 64 also solves for poles corresponding to the yaw rate transfer function $G_{rd}(s)$ and the lateral velocity transfer function $G_{v_{yd}}(s)$ as well. Specifically, the model building module 64 solves for the poles corresponding to the lateral velocity transfer function $G_{v_{yd}}(s)$ that results in the target transient lateral velocity $V_{yttarget}$ being achieved. Similarly, the model building module 64 solves for the poles corresponding to the lateral velocity transfer function $G_{v_{yd}}(s)$ that results in the target transient lateral velocity $V_{yttarget}$ being achieved.

The model building module 64 then executes an optimization process that employs a design of experiments technique to further adjust the target vehicle state during transient driving conditions, which include the target transient yaw rate $r_{ttarget}$ and the target transient lateral velocity $V_{yttarget}$. The optimization process includes selecting ranges for one of more calibration parameters of the driver command interpreter system 10, where the calibration parameters include the desired zero $z_{rd}$ for the yaw rate transfer function $G_{rd}(s)$, the desired zero $z_{v_{yd}}$ for the lateral velocity transfer function $G_{v_{yd}}(s)$, the poles for the yaw rate transfer function $G_{rd}(s)$ and the lateral velocity transfer function $G_{v_{yd}}(s)$, the desired natural frequency $\omega_{nd}$, the desired damping ratio &d, the yaw rate gain $\Omega_{gain}$, and the lateral velocity gain $V_{y,gain}$.

The optimization process includes executing a factorial design simulation based on the calibration parameters, where the factorial design simulation includes one or more vehicle dynamics tests. In an embodiment, the vehicle dynamics tests are based on the international organization for standards (ISO) standards for automotive testing, however, it is to be appreciated that other testing standards may be used as well. The optimization process includes recording objective metrics such as, for example, agility and stability, and then selecting the ranges for the calibration parameters that satisfy vehicle requirements. The optimization process may also employ one or more data mining techniques such as, for example, principal component analysis, for visualizing the results, and then stores the resulting calibration parameters and results of the data mining techniques.

It is to be appreciated that the model building module 64 determines the desired zeros $z_{rd}$, $z_{v_{yd}}$ and the poles corresponding to the yaw rate transfer function $G_{rd}(s)$ and the lateral velocity transfer function $G_{v_{yd}}(s)$ during an off-line process, and stores the desired zeros $z_{rd}$, $z_{v_{yd}}$ and the poles in memory, where the real-time calibration module 66 employs the desired zeros $z_{rd}$, $z_{v_{yd}}$ in real-time to determine real-time constraints upon the vehicle 12 during operation. Specifically, the real-time calibration module 66 of the one or more controllers 20 calculates the target vehicle state during both steady-state and transient driving conditions in real-time. Therefore, the location of the desired zero $z_{rd}$ for the yaw rate transfer function $G_{rd}(s)$, the desired zero $z_{v_{yd}}$ for the lateral velocity transfer function $G_{v_{yd}}(s)$, and the poles for the yaw rate transfer function $G_{rd}(s)$ and the lateral velocity transfer function $G_{v_{yd}}(s)$ are provided in real-time.

In an embodiment, the real-time calibration module 66 imposes real-time constraints upon the plurality of vehicle control systems 24 (FIG. 1). Specifically, in an embodiment, the real-time constraints include one or more of the following: a tire tractive limit, lateral adhesion limits, and an actuator bandwidth limit. The tire tractive limit ensures that differential force commands do not exceed their respective limits. The tire tractive limit defines constraints such as, but not limited to, lateral tire force saturation, delta wheel velocity control, wheel control arbitration, and tractive limits based on passenger comfort. The lateral adhesion limits define constraints on steering and ensure that the target yaw moment is feasible. The lateral adhesion limit defines constraints such as, but not limited to, a road steering wheel angle limit, electric power steering (EPS) control constraints, active rear-wheel steering (ARS) control constraints, and lateral adhesion limits based on passenger comfort. The actuator bandwidth limits ensure that target commands are achieved in a timely manner. The actuator bandwidth limits define constraints such as, for example, learned real-time actuator limits and actuator fault limits.

Figure 3:
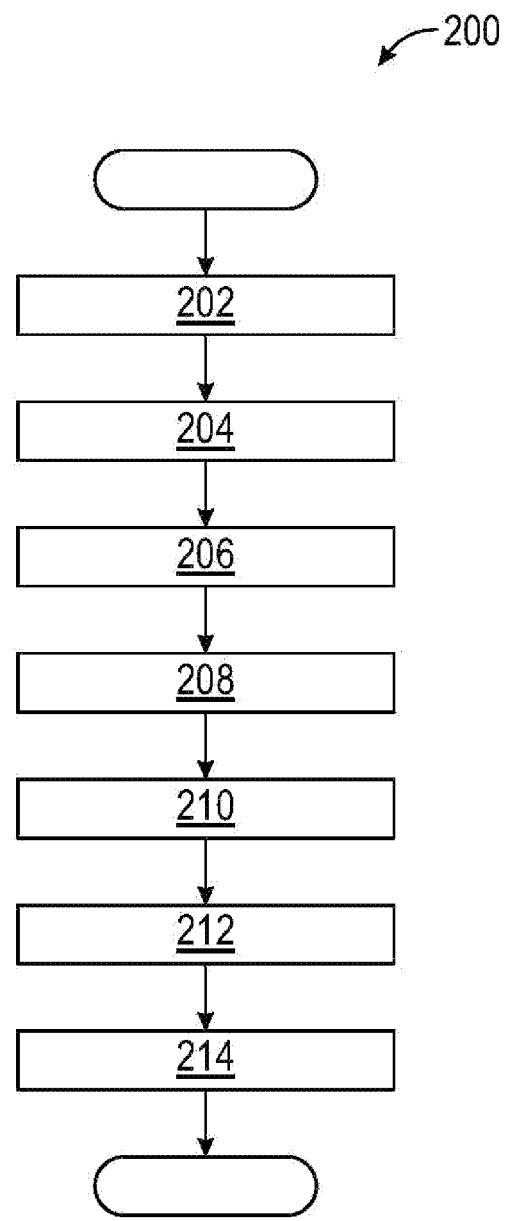
FIG. 3 is a process flow diagram illustrating a method for determining a target vehicle state during transient driving conditions by the driver command interpreter system, according to an exemplary embodiment.

FIG. 3 is an exemplary process flow diagram illustrating a method 200 for determining the target vehicle state during transient driving conditions by the driver command interpreter system 10. Referring generally to FIGS. 1-3, the method 200 may begin at block 202. In block 202, the steady-state target module 60 of the one or more controllers 20 receives the plurality of dynamic variables 70 from the plurality of sensors 22, the vehicle configuration information, and the driving environment conditions as input, and determines the target vehicle state during steady-state conditions based on the input. The method 200 may then proceed to block 204.

In block 204, the transient target module 62 of the one or more controllers 20 receives the plurality of dynamic variables 70, the vehicle configuration information, and the driving environment conditions as input and determines the target vehicle state during the transient driving conditions based on the input. Specifically, the target vehicle state during transient conditions include the target transient yaw rate $r_{ttarget}$ and the target transient lateral velocity $V_{yttarget}$. The method 200 may then proceed to block 206.

In block 206, the model building module 64 of the one or more controllers 20 builds the transient vehicle dynamic model based on the target transient yaw rate $r_{ttarget}$, the target transient lateral velocity $V_{yttarget}$, the plurality of dynamic variables 70, the vehicle configuration information, and the driving environment conditions. The method 200 may then proceed to block 208.

In block 208, the model building module 64 of the one or more controllers 20 solves for the desired zeros corresponding to the target vehicle state during transient conditions based on the transient vehicle dynamic model, where the desired zeros are shaped to result in the target vehicle state during the transient driving conditions being achieved. Specifically, as mentioned above, the model building module 64 then solves for the desired zero $z_{rd}$ for the yaw rate transfer function $G_{rd}(s)$ that results in the target transient yaw rate $r_{ttarget}$ being achieved as well as the desired zero $z_{v_{yd}}$ for the lateral velocity transfer function $G_{v_{yd}}(s)$ that results in the target transient lateral velocity $V_{yttarget}$ being achieved. The method 200 may then proceed to block 210.

In block 210, the model building module 64 executes the optimization process that employs a design of experiments technique to further adjust the target vehicle state during transient driving conditions. The method 200 may then proceed to block 212.

In block 212, the one or more controllers 20 store the desired zeros $z_{rd}$, $z_{v_{yd}}$ and the poles in memory. It is to be appreciated that determining the desired zeros $z_{rd}$, $z_{v_{yd}}$ and the poles is an off-line process. The method 200 may then proceed to block 214.

In block 214, the real-time calibration module 66 of the one or more controllers 20 employs the desired zeros $z_{rd}$, $z_{v_{yd}}$ in real-time to determine real-time constraints upon the vehicle 12 during operation. The method 200 may then terminate.

Current driver command interpreters presently available rely heavily on steady-state behavior of the vehicle's lateral dynamics, which may create issues when attempting to determine the vehicle's response during highly dynamic situations. The driver command interpreter also assumes that the steady-state behavior of a vehicle's lateral motion under normal driving conditions is actually desired by a driver. Furthermore, if the road surface is slippery due to conditions such as rain, ice, or snow, then the adhesion characteristics of the vehicle's tires are no longer linear. However, the equations that are relied upon by the driver command interpreter still assume linear tire adhesion characteristics that are produced based on dry road conditions. As a result, performance vehicles, which are constructed specifically for speed, may exhibit reduced transient handling control. Moreover, electric vehicles, which are considerably heavier in weight when compared to vehicles that employ internal combustion engines, may also exhibit reduced agility and stability because of the above-mentioned issues.

Referring generally to the figures, the disclosed driver command interpreter system provides various technical effects and benefits. The disclosed driver command interpreter system determines a target vehicle state during transient driving conditions based on specific agility and stability requirements of the vehicle. This results in enhancing vehicle agility, transient response, and vehicle lateral motion, which in turn may enhance customer satisfaction.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A driver command interpreter system for a vehicle, the driver command interpreter system comprising:
   one or more controllers executing instructions to:
   receive a plurality of dynamic variables that each represent an operating parameter indicative of a dynamic state of the vehicle, vehicle configuration information, and driving environment conditions;
   determine a target vehicle state during transient driving conditions based on the plurality of dynamic variables, the vehicle configuration information, and the driving environment conditions;
   build a transient vehicle dynamic model based on the target vehicle state during transient driving conditions, the plurality of dynamic variables, the vehicle configuration information, and the driving environment conditions;
   solve for desired zeros corresponding to the target vehicle state during transient conditions based on the transient vehicle dynamic model, wherein the desired zeros are shaped to result in the target vehicle state during the transient driving conditions being achieved; and
   stores the desired zeros in memory, wherein the one or more controllers employ the desired zeros in real-time to determine real-time constraints upon the vehicle during operation.

2. The driver command interpreter system of claim 1, wherein the target vehicle state during transient conditions include a target transient yaw rate and a target transient lateral velocity.

3. The driver command interpreter system of claim 2, wherein the one or more controllers execute instructions to:
   solve for the desired zero corresponding to a yaw rate transfer function that results in the target transient yaw rate being achieved.

4. The driver command interpreter system of claim 3, wherein the yaw rate transfer function is expressed as:

$$G_{rd}(s) = \frac{\left(\frac{s}{z_{rd}} + 1\right)\omega_{nd}^2}{s^2 + 2\xi_d \omega_{nd} s + \omega_{nd}^2} \Omega_{gain}$$

wherein s is a Laplace operator, $G_{rd}(s)$ is the yaw rate transfer function, $z_{rd}$ is the desired zero for the yaw rate transfer function $G_{rd}(s)$, $\omega_{nd}$ is a desired natural frequency, $\xi_d$ is a desired damping ratio, and $\Omega_{gain}$ is the gain of the yaw rate.

5. The driver command interpreter system of claim 2, wherein the one or more controllers execute instructions to: solve for the desired zero corresponding to a lateral velocity transfer function that results in the target transient lateral velocity being achieved.

6. The driver command interpreter system of claim 5, wherein the target transient lateral velocity is expressed as:

$$G_{v_yd}(s) = \frac{\left(\frac{s}{z_{v_{yd}}} + 1\right)\omega_{nd}^2}{s^2 + 2\xi_d\omega_{nd}s + \omega_{nd}^2} V_{y\_gain}$$

wherein s is a Laplace operator, $G_{v_yd}(s)$ is the $G_{v_yd}(s)$, $\omega_{nd}$ is a desired natural frequency, $\xi_d$ is a desired damping ratio, $z_{v_{yd}}$ is the desired zero for the lateral velocity transfer function $G_{v_yd}(s)$, and $V_{y\_gain}$ is the gain of the lateral velocity.

7. The driver command interpreter system of claim 2, wherein the target transient yaw rate is calculated based on one or more of the following: a size of the vehicle, a mass of the vehicle, a class of the vehicle, a type of the vehicle, the vehicle configuration information, and an expected response of the vehicle.

8. The driver command interpreter system of claim 2, wherein the target transient lateral velocity is calculated based on one or more of the following: a class of the vehicle, a type of the vehicle, a suspension type of the vehicle, a specific actuator set of the vehicle that is currently being used to execute a driving maneuver, and a perceived yaw center of the vehicle.

9. The driver command interpreter system of claim 1, wherein the transient vehicle dynamic model is based on a two-degree-of-freedom bicycle model.

10. The driver command interpreter system of claim 1, wherein the real-time constraints include one or more of the following: a tire tractive limit, lateral adhesion limits, and actuator bandwidth limits.

11. The driver command interpreter system of claim 1, wherein the vehicle configuration information indicates one or more of the following: a size of the vehicle, a mass of the vehicle, a class of the vehicle, a type of the vehicle, a number of wheels of the vehicle, a number of driven wheels of the vehicle, and number of steered wheels of the vehicle.

12. The driver command interpreter system of claim 1, wherein the driving environment conditions include one or more of the following: type of road, road surface, and weather conditions.

13. The driver command interpreter system of claim 1, wherein the one or more controllers execute instructions to: determine the target vehicle state during steady-state conditions based on the plurality of dynamic variables, the vehicle configuration information, and the driving environment conditions.

14. A vehicle, comprising:
a driver command interpreter system, comprising:
a plurality of sensors that collects a plurality of dynamic variables that each represent an operating parameter indicative of a dynamic state of the vehicle;
one or more controllers in electronic communication with the plurality of sensors, the one or more controllers executing instructions to:
receive the plurality of dynamic variables from the plurality of sensors, vehicle configuration information, and driving environment conditions;
determine a target vehicle state during transient driving conditions based on the plurality of dynamic variables from the plurality of sensors, the vehicle configuration information, and the driving environment conditions;
build a transient vehicle dynamic model based on the target vehicle state during transient driving conditions, the plurality of dynamic variables, the vehicle configuration information, and the driving environment conditions;
solve for desired zeros corresponding to the target vehicle state during transient conditions based on the transient vehicle dynamic model, wherein the desired zeros are shaped to result in the target vehicle state during the transient driving conditions being achieved; and
store the desired zeros in memory, wherein the one or more controllers employ the desired zeros in real-time to determine real-time constraints upon the vehicle during operation.

15. The vehicle of claim 14, wherein the target vehicle state during transient conditions include a target transient yaw rate and a target transient lateral velocity.

16. The vehicle of claim 15, wherein the one or more controllers execute instructions to:
solve for the desired zero corresponding to a yaw rate transfer function that results in the target transient yaw rate being achieved.

17. The vehicle of claim 16, wherein the yaw rate transfer function is expressed as:

$$G_{rd}(s) = \frac{\left(\frac{s}{z_{rd}} + 1\right)\omega_{nd}^2}{s^2 + 2\xi_d\omega_{nd}s + \omega_{nd}^2} \Omega_{gain}$$

wherein s is a Laplace operator, $G_{rd}(s)$ is the yaw rate transfer function, $z_{rd}$ is the desired zero for the yaw rate transfer function $G_{rd}(s)$, $\omega_{nd}$ is a desired natural frequency, $\xi_d$ is a desired damping ratio, and $\Omega_{gain}$ is the gain of the yaw rate.

18. The vehicle of claim 15, wherein the one or more controllers execute instructions to:
solve for the desired zero corresponding to a lateral velocity transfer function that results in the target transient lateral velocity being achieved.

19. The vehicle of claim 15, wherein the target transient lateral velocity is expressed as:

$$G_{v_yd}(s) = \frac{\left(\frac{s}{z_{v_{yd}}} + 1\right)\omega_{nd}^2}{s^2 + 2\xi_d\omega_{nd}s + \omega_{nd}^2} V_{y\_gain}$$

wherein s is a Laplace operator, $G_{v_yd}(s)$ is the $G_{v_yd}(s)$, $\omega_{nd}$ is a desired natural frequency, $\xi_d$ is a desired damping ratio, $z_{v_{yd}}$ is the desired zero for the lateral velocity transfer function $G_{v_yd}(s)$, and $V_{y\_gain}$ is the gain of the lateral velocity.

20. A method for determining a target vehicle state during transient driving conditions by a driver command interpreter system, the method comprising:
- receiving, by one or more controllers, a plurality of dynamic variables from a plurality of sensors, vehicle configuration information, and driving environment conditions, wherein the plurality of dynamic variables each represent an operating parameter indicative of a dynamic state of the vehicle;
- determining a target vehicle state during transient driving conditions based on the plurality of dynamic variables from the plurality of sensors, the vehicle configuration information, and the driving environment conditions;
- building a transient vehicle dynamic model based on the target vehicle state during transient driving conditions, the plurality of dynamic variables, the vehicle configuration information, and the driving environment conditions;
- solving for desired zeros corresponding to the target vehicle state during the transient driving conditions based on the transient vehicle dynamic model, wherein the desired zeros are shaped to result in the target vehicle state during the transient driving conditions being achieved; and
- storing the desired zeros in memory, wherein the one or more controllers employ the desired zeros in real-time to determine real-time constraints upon a vehicle during operation.

* * * * *